(12) United States Patent
Kulaga et al.

(10) Patent No.: US 8,806,009 B2
(45) Date of Patent: *Aug. 12, 2014

(54) SYSTEM AND METHOD FOR OPTIMIZATION OF SECURITY TASKS BY CONFIGURING SECURITY MODULES

(71) Applicant: Kaspersky Lab, ZAO, Moscow (RU)

(72) Inventors: Andrey Kulaga, Smolensk (RU); Anton Tikhomirov, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 10 days.

This patent is subject to a terminal disclaimer.

(21) Appl. No.: 13/850,390

(22) Filed: Mar. 26, 2013

(65) Prior Publication Data

US 2013/0219495 A1    Aug. 22, 2013

Related U.S. Application Data

(63) Continuation of application No. 13/031,200, filed on Feb. 19, 2011, now Pat. No. 8,433,792.

(30) Foreign Application Priority Data

Dec. 30, 2010 (RU) ................. 2010154527

(51) Int. Cl.
*G06F 15/173* (2006.01)
*H04L 29/06* (2006.01)
*H04L 12/24* (2006.01)

(52) U.S. Cl.
CPC ............ *H04L 63/20* (2013.01); *H04L 41/0816* (2013.01); *H04L 63/1441* (2013.01)
USPC ....................................... 709/224

(58) Field of Classification Search
CPC .............. H04L 63/145; H04L 63/1466; H04L 63/1441; H04L 63/1433; H04L 61/103; H04L 41/0853; G06F 21/174; G06F 21/56; G06F 21/566
USPC ................................. 709/203, 224
See application file for complete search history.

(56) References Cited

U.S. PATENT DOCUMENTS

| | | | |
|---|---|---|---|
| 8,433,792 B2 * | 4/2013 | Kulaga et al. | 709/224 |
| 2008/0209033 A1 * | 8/2008 | Ginter et al. | 709/224 |
| 2012/0167168 A1 * | 6/2012 | Orr et al. | 726/1 |

* cited by examiner

*Primary Examiner* — Larry Donaghue
(74) *Attorney, Agent, or Firm* — Bardmesser Law Group

(57) ABSTRACT

A system and method for dynamic configuration of the security modules for optimization of execution of security tasks are provided. The system includes: a mechanism for identifying the clients connected to the network; a client data collection unit that determines hardware/software configurations of each detected client; a security module selection and installation unit that selects required modules for each client; a statistics collection unit that collects the security tasks execution statistics from user modules and from client modules; and a configuration unit that configures the client and server modules based on the collected statistics in order to optimize execution of the security tasks.

20 Claims, 13 Drawing Sheets

Conventional Art

SYSTEM AND METHOD FOR OPTIMIZATION OF SECURITY TASKS BY CONFIGURING SECURITY MODULES

CROSS-REFERENCE TO RELATED APPLICATIONS

This application is a continuation of U.S. patent application Ser. No. 13/031,200, filed on Feb. 19, 2011, which claims priority to RU 2010154527, filed on Dec. 30, 2010, which is incorporated herein by reference in its entirety.

BACKGROUND OF THE INVENTION

1. Field of the Invention

The present invention is related to methods for anti-virus (AV) protection and, in particular, to a method and system for dynamic configuration of security modules in local network for optimization of security tasks.

2. Description of the Related Art

Security of data located on user PCs, mobile devices or within enterprise systems is a problem that only becomes more complex every day. A large number of new malware applications appear practically every day. Each of these malware applications can cause computer failures or result in a loss or theft of critical personal user data. Many of the known malware applications are frequently modified, so they become harder to detect.

Modern computer threats include not only the typical computer viruses but more sophisticated malware applications, such as, for example, Trojans, worms, rootkits, exploits, etc. For example, the rootkits hide their presence in the operating system, which makes them difficult to detect. The exploits use application vulnerabilities for attacks and for gaining unauthorized access to the system resources.

Modern AV solutions, such as Symantec Endpoint Protection, McAfee Total Protection and Trend Micro Worry-Free Business Security, successfully deal with the majority of existing threats. However, some security issues still exist. One of the problems is that enterprise networks contain a large number of computers with various sets of hardware components. In some networks, older versions exist that do not provide sufficient resources for modern applications, as do modern OSs (such as, for example, Microsoft Windows 7) and newest version of the AV applications.

Furthermore, modern AV applications and/or security systems contain a large number of modules that deal with various tasks. FIG. 1 depicts a typical set of security modules. Some of these modules are necessary for the functionality of user applications (for example, an update module and a file anti-virus).

Other modules may be required depending on user needs. For example, email and Internet require additional modules, such as: mail anti-virus (AV) 115, web AV 120, IM AV 125 (for checking data exchanged using Instant Messenger), firewall 135, file AV 110, etc. Some other modules can be used as additional security means, such as: anti-spam module 140, a backup module 160, a personal data manager 175, a virtual keyboard 190, data encryption module 170, control center 165, anti-phishing module 145, etc.

Modules, such as an anti-banner module 150 and parental control 185 are used by web browsers for Internet surfing. Some modules require a lot of system resources and time for checking the system. However, some of these modules can be effective even against unknown malware objects and new types of attacks.

For example, Host Intrusion Prevention System (HIPS) module 130 limits access to computer resources for unknown applications; a Proactive Defense Module 199 can detect infection in its active phase; an emulator 195 and a Virtual Machine 155 are used for safe execution of unknown executable files. All these modules use system resources (i.e., processor time and memory) at different levels.

AV application vendors duplicate security-related functionality at different network nodes. For example, effective anti-spam solution used at network gateway can eliminate a necessity of using this solution on the end user computers. However, when functionality of AV applications is moved to servers or central network nodes, the problem of insufficient protection of the end user computers becomes critical.

If a malware object is missed at the network gateway (for example, an unknown net worm), all network computers will get infected, if each user computer does not have additional AV protection. Therefore, a security system needs to be balanced at all levels. For example, a security application can be installed on each user computer based on specific user parameters. This reduces the use of system resources.

U.S. Publication No. 2010/0138479A1 describes traffic minimization when loading application modules onto the clients. Each client can select required modules from the list (package definition file) for loading. In U.S. Publication No. 2010/0042991A1 the system allows for configuring a list of user applications based on user hardware settings (including hardware changes).

WO 2010/016833A1 discloses installation of applications as an array that depends on specific flags. The flags can be based upon hardware configuration or can be based on computer users. U.S. Publication No. 2003/0200149A1 is directed to creation of a list of required applications in terms of its compatibility with the initial hardware. In order to determine compatibility, application test data with various hardware configurations is used. Once the user selects required hardware, he is automatically provided with a list of recommended applications.

Another solution is a task delegation from the end user computers to a central server. However, the conventional art only deals with load optimization and does not solve a problem of risk level determination. For example U.S. Pat. No. 6,920,632B2 provides an algorithm for cyclical task execution. The tasks are given priorities, and resources are allocated based on the priorities. The invention also solves a problem of resource allocation in cases of priority conflicts and when resources are insufficient.

U.S. Pat. No. 6,377,975B1 discloses task delegation to a least loaded server. All security servers are polled and a possibility of distributing the task among several servers is also determined. KR 2007/032441A deals with load balancing by selecting the least loaded server using fuzzy logic.

Accordingly, there is a need in the art for a system and method that delegate security tasks from the clients (i.e., end user stations) to a server, taking into account importance and priority of the tasks. It is also desired to solve some of the security problems locally on the client. It is also desired to pre-select security tasks on the server for the fastest and efficient execution of these tasks. There is also a need in the art for a system for dynamic configuration of the security modules within a local network for optimization of the security tasks.

SUMMARY OF THE INVENTION

The present invention is related to methods for anti-virus (AV) protection. The present invention provides a method, system and computer program product for dynamic configuration of security modules in local network for optimization of security tasks that substantially obviates one or several of the disadvantages of the related art.

In one aspect of the invention, a method for dynamic configuration of the security modules is provided. The method comprising: (a) collecting clients' configuration data; (b) installing security modules on each client based on client configuration; (c) monitoring execution of security tasks on the clients and on the server; (d) collecting statistics of execution of the security tasks on the clients and on the server; (e) analyzing execution of the security tasks based on the collected statistics; and (f) re-configuring client and server security modules based on the collected statistics. Therefore, execution of the security tasks is optimized.

A system for implementing the method for dynamic configuration of the security modules includes: a client detection unit that finds the clients on the network; a client data collection unit that determines hardware/software configurations of each detected client; a security module selection and installation unit that selects required modules for each client from a modules database; a statistics collection unit that collects the security tasks execution statistics from user modules and from client modules; and a re-configuration unit that re-configures the client and server modules based on the collected statistics in order to optimize execution of the security tasks.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

According to the exemplary embodiment, a method for dynamic configuration of the security modules is provided. According to the proposed method, clients' configuration data is collected and security modules are installed on each client based on clients' configuration data. Executions of the security tasks on the clients and on the server are monitored and analyzed. The execution statistics are collected, and the clients' and the server's security modules are re-configured based on the collected execution statistics. Accordingly, the execution of the security tasks is optimized.

According to the exemplary embodiment, the security modules can be any of: a file anti-virus (AV), a mail AV, a web AV, an Instant Messenger (IM) AV, a Host Intrusion Prevention System (HIPS) module, a network screen, an anti-spam module, an anti-phishing module, a virtual machine, an emulator, a virtual keyboard, a parental control module, an update module, a personal data manager, an encryption module, a backup module, etc.

Figure 2:
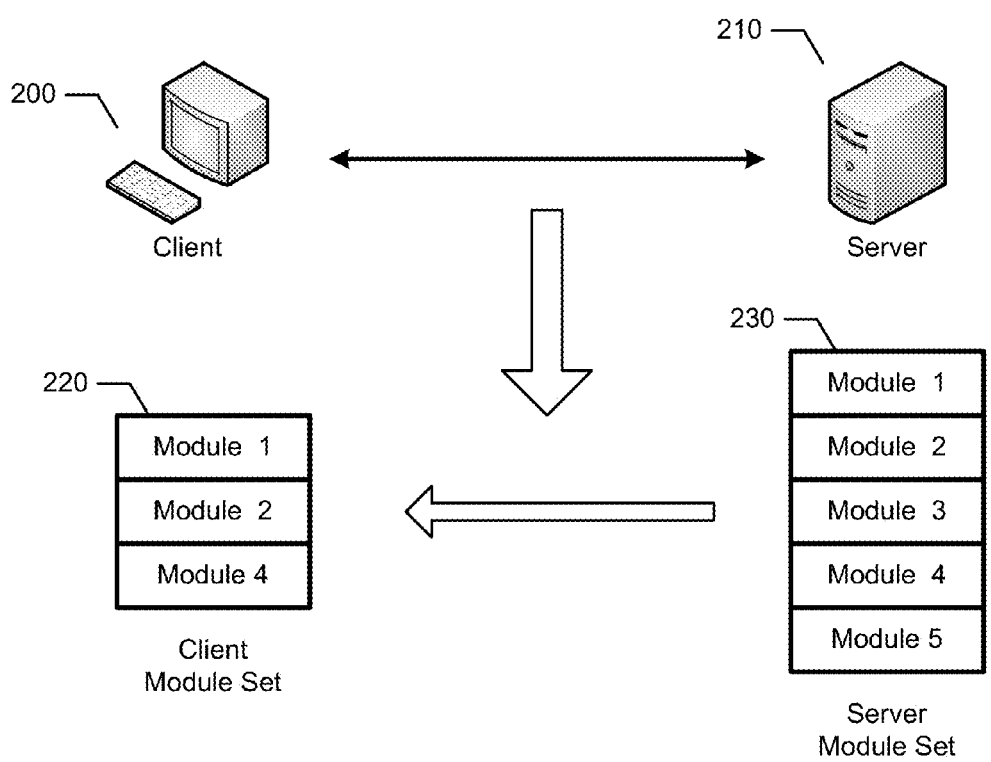
FIG. 2 illustrates selection of security modules for an exemplary client.

FIG. 2 illustrates selection of security modules for an exemplary client. A client 200 is a user computer with a certain software/hardware configuration. A server 210 provides administration and security services to the client 200. These services can be implemented, for example, by Kaspersky Security for Microsoft Exchange Server, Kaspersky Anti-Virus for Windows Servers, Kaspersky Anti-Virus for Windows Workstations, etc. These services are controlled by Kaspersky Administration Kit application.

Figure 1:
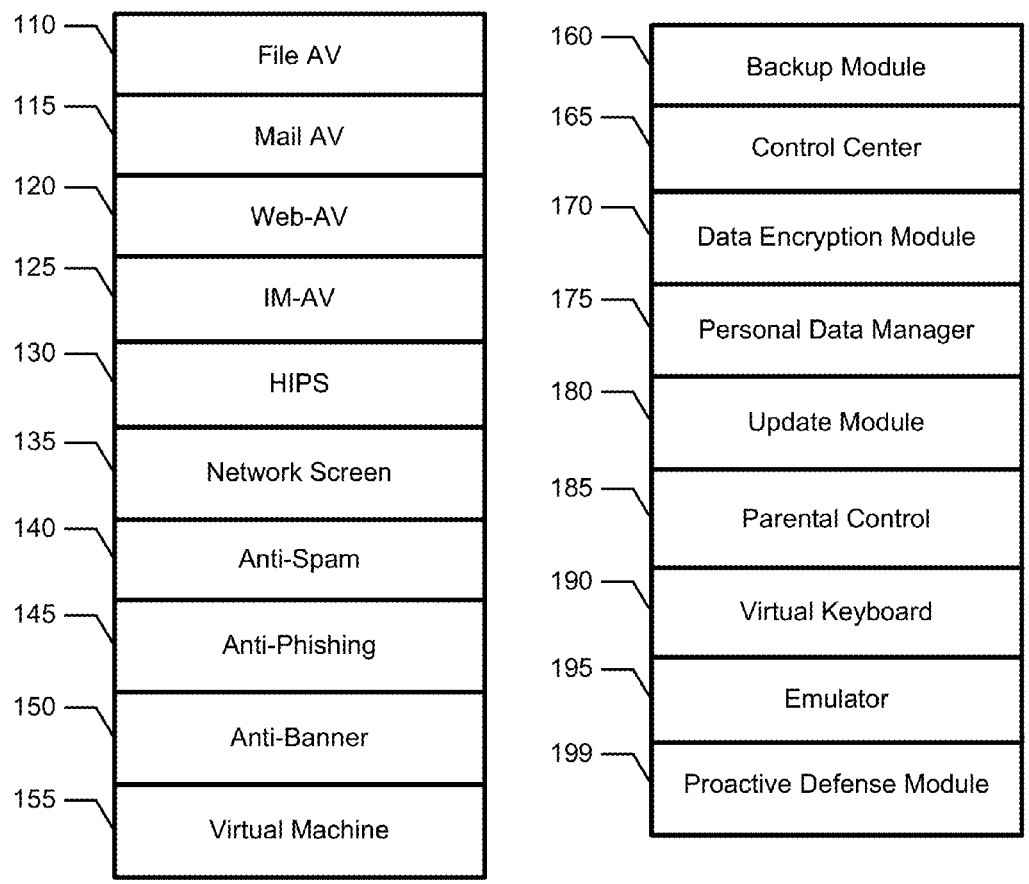
FIG. 1 depicts a typical set of security modules.

The server 210 performs security tasks and also stores a selection of security modules that need to be installed on user computers such as the client 200. Each security module is dedicated to execution of a particular security task (or a set of related tasks). In other words, the server 210 provides end-point protection within a local network. The server 210 has a set of modules 230 that a similar to the modules depicted in FIG. 1. For each client 200, a set of modules 220 that fit the client's configuration is selected.

Figure 3A:
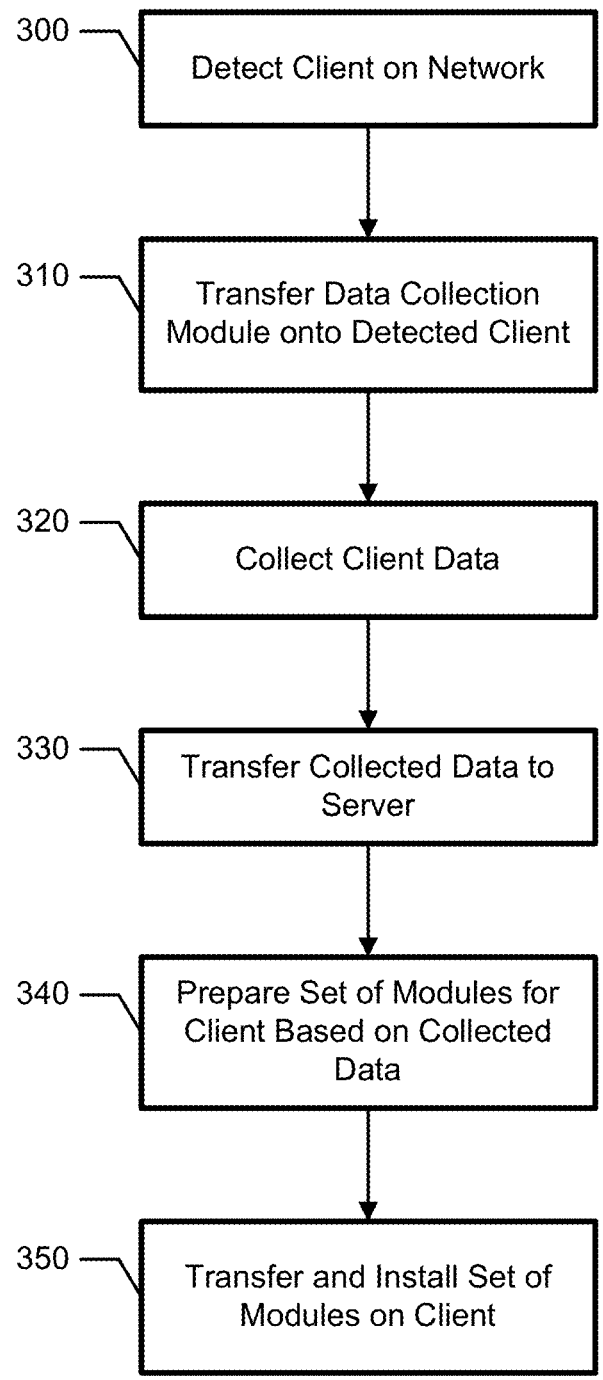
FIG. 3A illustrates a block diagram of installation of security module on a client.

FIG. 3A illustrates a block diagram of installation of security module on a client. In step 300, the client is detected on network. This can be done as a part of periodic check of all network nodes with detection of the new nodes. ARP-spoofing technology can be used for detection of clients on a network. This technology intercepts traffic between the network nodes using the ARP protocol. The ARP protocol allows for interception of a broadcast APR request on an unknown host within a network. Then, a false APR response is sent back. In this response the interceptor host is declared as a real target host (e.g., a router) and then the network traffic is controlled by this host.

In step 310, a data collection module is transferred onto the detected client. Then, in step 320, client data is collected. The data collection module collects data related to hardware configuration of the client (a processor, memory volume, connection capacity, etc.), client OS data and installed applications data. This data can be collected by a single module or by several independent applications, such as, for example, LOGINventory, ServiceDesk Plus, etc. Also, the data can be collected by OS means, such as Windows Management Instrumentation (WMI).

Figure 3B:
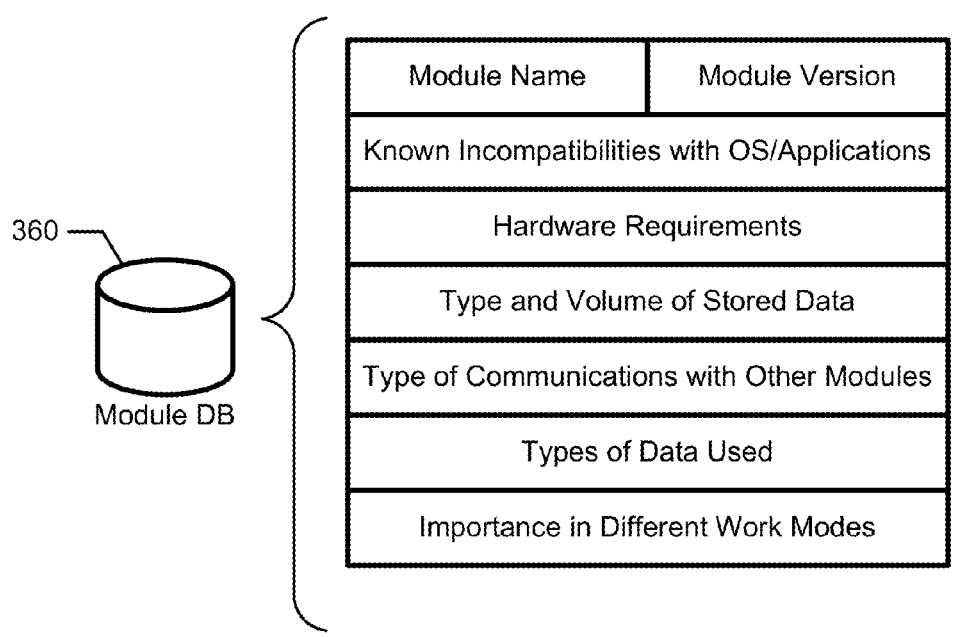
FIG. 3B illustrates a structure of an exemplary module database.

The collected data is transferred to the server in step 330. Then, in step 340, a set of modules is prepared based on the collected client data. In step 350, the set of modules is transferred to the client and installed. The set of client modules is selected using data from a module database containing data about functionality of each module. The module database 360 is depicted in FIG. 3B.

The database 360 contains the following data: module name, module version, known incompatibilities with client OS and applications, module hardware requirements, type and volume of data, types of communication with other modules (for example, update module communicates with all other modules), type of data used for processing (for example, an emulator works with files' Portable Executable (PE)-structure), importance in different work modes (for example, a file AV is a critically important module that uses signatures of known malware objects).

Note that the above data is used as an example and the database 360 can contain arbitrary data. In order to select client module, the client data collected in step 330 is compared to the data contained in the module database 360.

A selection rule can be implemented as "IF . . . THEN . . . ", where "IF" checks for a certain condition. For example, if the client 200 has a web browser installed, then, if no incompatibilities exist and the client 200 has sufficient resources, a web AV is included in the set of modules installed on the client 200.

If the client data indicates that a large number of applications require user authorization, the set of user modules includes an encryption module and a personal data managing module. If the client has several users, parental control module can be included as well. In other words, a set of modules installed on the clients can vary significantly based on the client configurations.

After user modules are installed on the client 200, in step 350, if some modules are missing, the client 200 has to skip certain security events (i.e., for example, scanning web page for malware or links) or the client 200 has to delegate the tasks related to the security events to the server 210.

Figure 4:
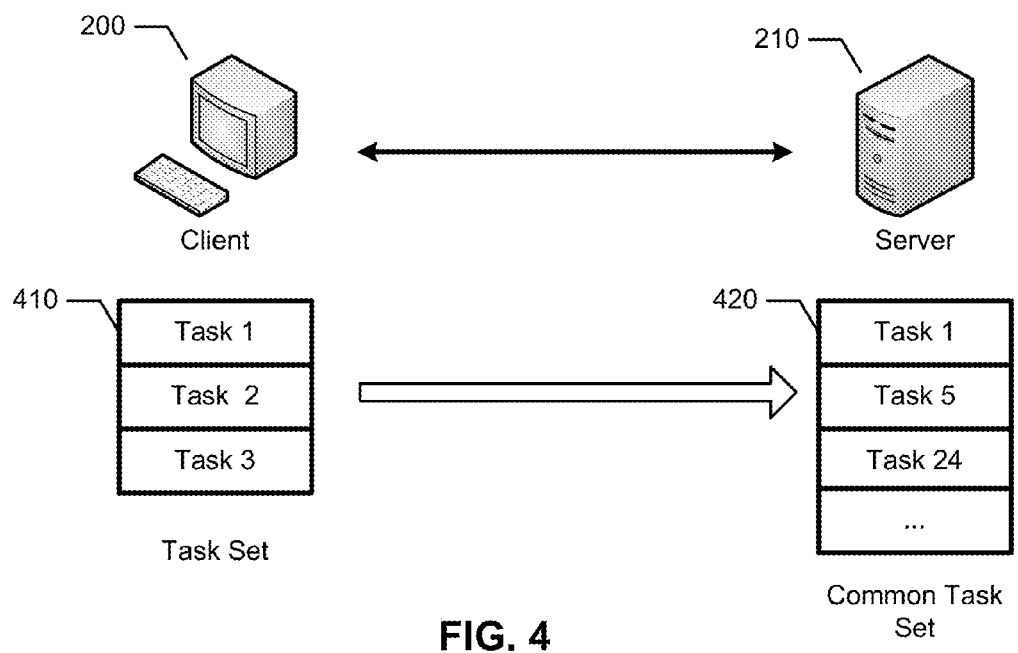
FIG. 4 illustrates task delegation from a client to a server, in accordance with the exemplary embodiment.

FIG. 4 illustrates task delegation from a client to a server, in accordance with the exemplary embodiment. The client 200 has a set of security tasks 410 that it cannot execute on his own. The client 200 delegates the tasks 410 to the server 210 that has common tasks set 420. Each server side task has its own parameters, such as, priority, task type, required data, etc. At delegation, the task priority can be set by the user (manually) or it can be determined using a priority algorithm that uses objects' data (i.e., file, reference, message, etc.).

Figure 5:
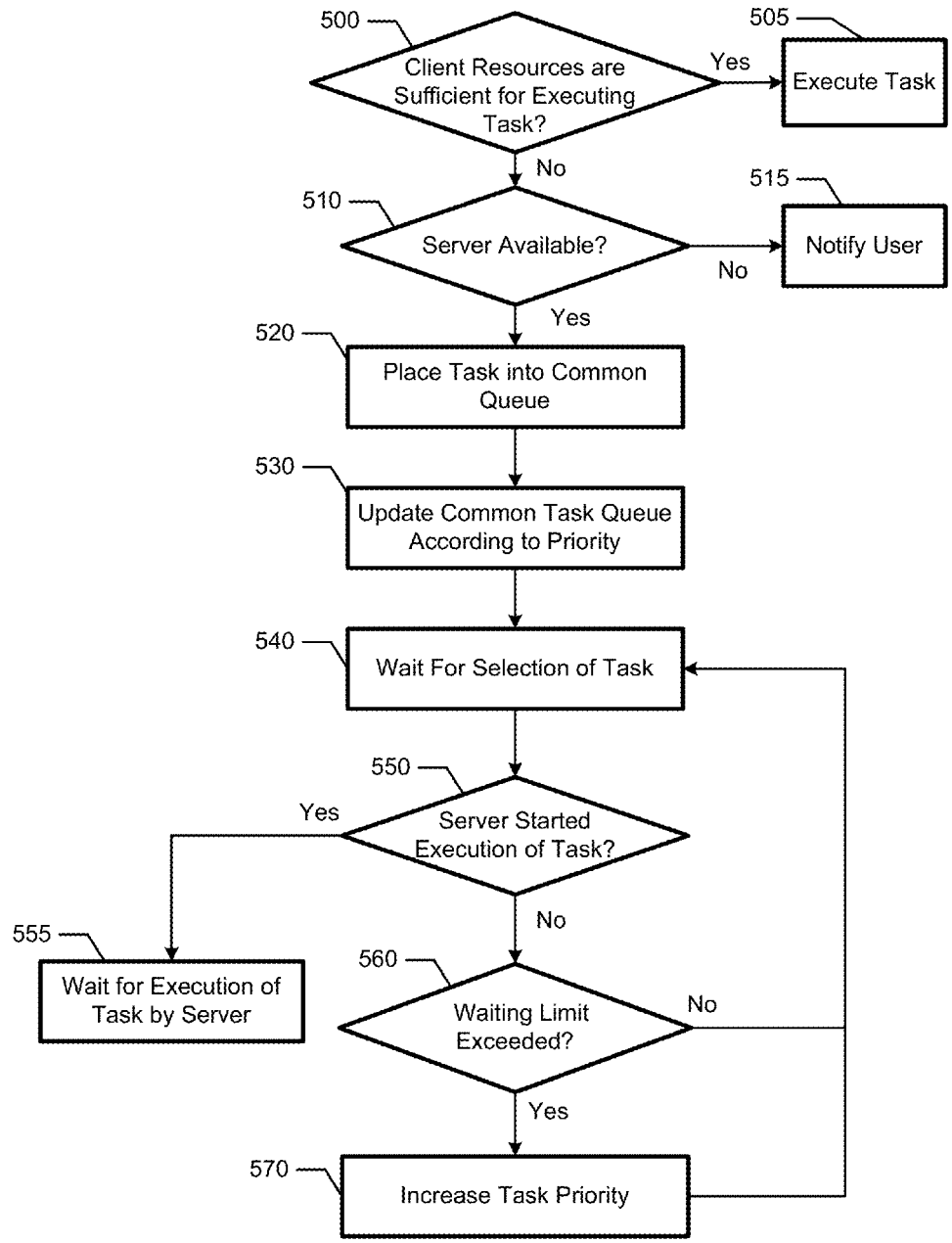
FIG. 5 illustrates a block diagram of an algorithm for delegation of security tasks to the server, in accordance with the exemplary embodiment.

According to the exemplary embodiment, data transfer can be implemented as a stage-by-stage "request-answer" schema depicted in FIG. 5. Security tasks can be any of: AV processing of files and web pages, emulation of executable files, execution of the executable files in a virtual environment, checking emails for spam, data encryption, management of personal data, secure data input (using virtual keyboard), backup copying, update of module database, parental control, limiting applications access to system resources, control of network connections, blocking of unwanted content, etc.

FIG. 5 illustrates a block diagram of an algorithm for delegation of security tasks to the server. In step 500, it is determined if a client has sufficient resources for executing a task. The client resources are modules required for the security tasks (i.e., for example, file AV that checks the files on the hard disk). If the client resources are sufficient, the task is executed on the client in step 505.

Otherwise, in step 510, it is determined if a server is available for execution of delegated tasks. If the server is not available, the user is notified in step 515 and delegation does not occur. If the server is available, a task is placed into a common queue in step 520. The common task queue is updated and the tasks are reordered according to their priority in step 530. The task waits for its execution in step 540. In step 550, the system checks if the server has started execution of the task.

If the server has started execution for the task, in step 555, the system waits for completion of the task execution by the server. However, if the task execution has not yet been started by the server in step 550, the system checks if a waiting limit has been exceeded in step 560. If the waiting limit has not been exceeded, the process goes back to step 540 and waits for beginning of task execution. If the waiting limit has been exceeded in step 560, the task priority is increased in step 570 and the task goes back to step 540 where it waits for execution.

The process is repeated until the task is not sent for execution (step 555). Therefore, execution of the security task from each client is guaranteed. Each task has a set of designated data. For example, in case of file checks, it can be data that is related to the file (e.g., a hash-value, a digital signature, a file size data, a file location, attributes of a command string, file attributes (e.g., a hidden archive), file source (network address), last modification, etc.).

In case of checking the web page, it can be, for example, an address (reference) of the web page, check configurations of script emulator (i.e., which scripts to be checked to which depth and which objects to be checked at each level). According to the exemplary embodiment, an algorithm of incremental server data requests is implemented in order to minimize amounts of data sent to the server.

All data related to the checked object can be separated into several types: necessary, important and optional. The necessary data is the data needed for producing a check verdict. For example, in case of a file, it is hash-sum that allows immediately check the file against black list/white list. Another necessary data is an object pointer (e.g., page reference) or the object itself (e.g., an executable file that needs to be launched in a safe environment).

The important data can be, for example, file attributes (e.g., signature or attributes of the command string). The important data is needed for a more precise verdict. The optional is the data that is not relevant for verdict generation. For example, a file name is optional (since some Trojans can have normal file names). Thus, the task is executed incrementally. First the necessary data is used, and if it is not enough (for example, a hash sum is not found in either black or white lists) the important data is used. And only then, some optional data can be considered.

Figure 6:
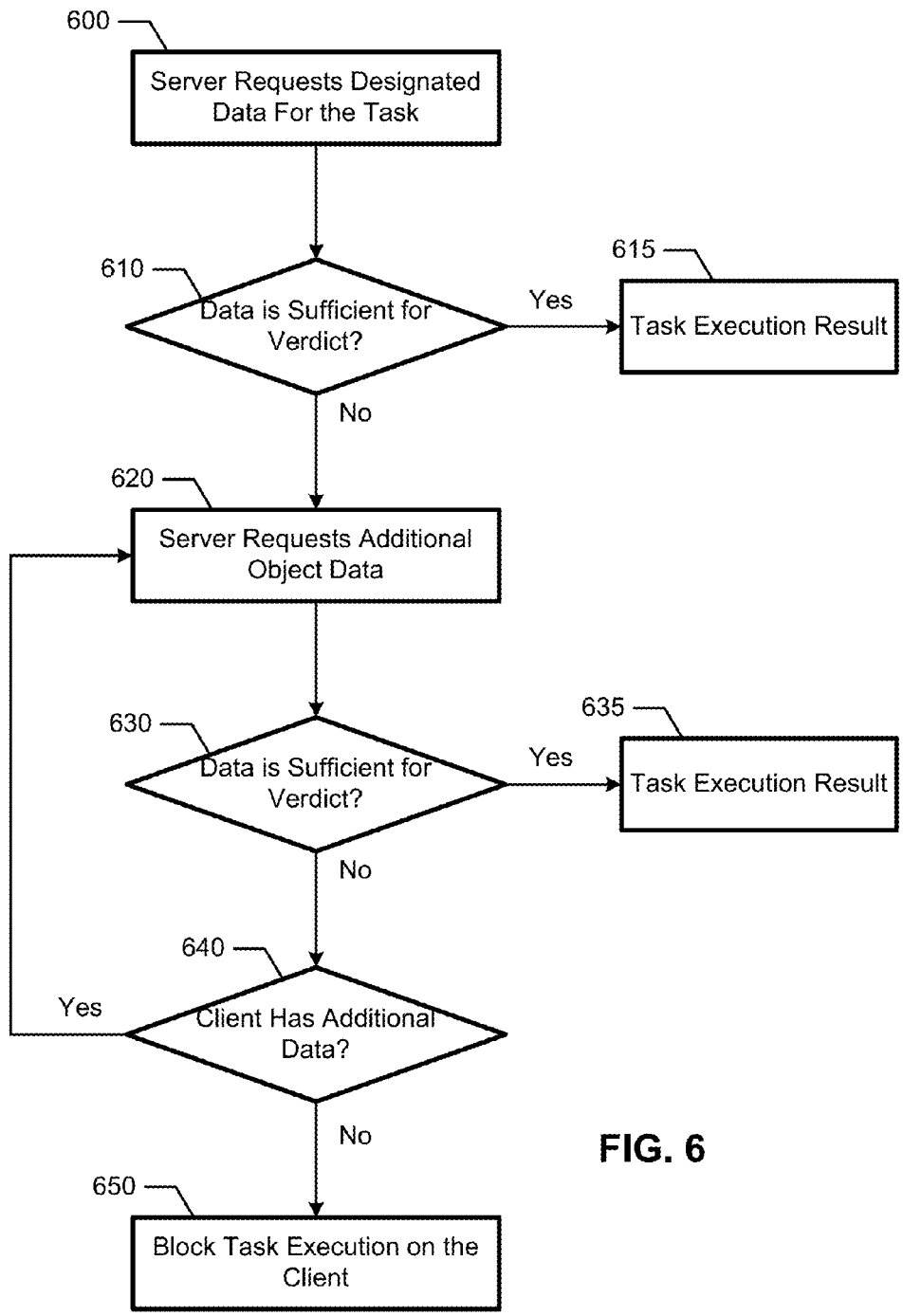
FIG. 6 illustrates an algorithm for requesting designated data by the server for execution of a delegated task, in accordance with the exemplary embodiment.

FIG. 6 illustrates an algorithm for requesting designated data by the server for execution of a delegated task. In step 600, the server requests designated data for execution of the delegated task. For example, in case of a file, it can be a hash-value. Step 610 checks if the data is sufficient for a verdict regarding this task. If the data is sufficient (i.e., for example, a hash value is found in a blacklist database), the task is executed in step 615 and results are provided to the client.

If the data is not sufficient in step 610, the server requests additional object's data in step 620. For example, the additional data can be a digital signature or file attributes (e.g., file extension, file wrapper, location, size, etc.). In step 630, it is determined if the data is sufficient for a verdict regarding the current task. If the data is sufficient, the task is executed in step 635 and the results is provided to the client. If the data is insufficient in step 630, the process checks, in step 640, if the client has some additional object data available.

For example, in the case of an emulator, the client can provide an emulation log to the server. According to the exemplary embodiment, the emulation can be performed using different configurations. For example, the client can have light configuration for minimization of time and resource consumption. Then, the server can perform the emulation using more strict configurations, because some malware have anti-emulation features and cannot be detected on the client. Additionally, a number of instructions in the application and a number of API calls can be sent to the server to complement the log. If the client does not have additional data and the server cannot make a verdict, in step 650 the task execution is blocked on the client because of security concerns.

Figure 7:
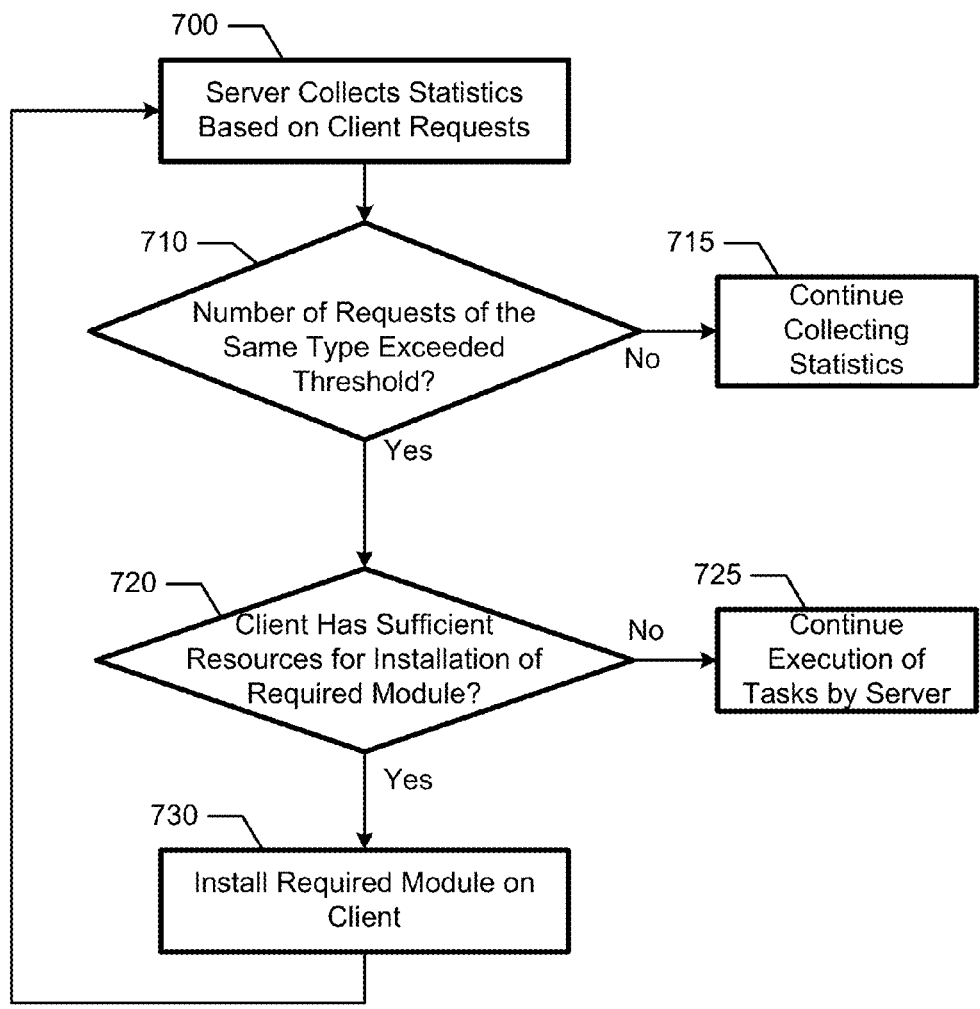
FIG. 7 illustrates a block diagram of an algorithm for re-configuration of client module set, in accordance with the exemplary embodiment.

FIG. 7 illustrates a block diagram of an algorithm for re-configuration of client module set. In step 700, the server collects statistics bases on clients' requests. The server analyses the clients' requests and the clients' module sets. In step 710, the process determines if a number of requests of the same type exceed a threshold. The requests of the same type can be, for example, the request for file checks or for spam analysis of the incoming mail, request for web page checks, check of the files received over the network, requests for backups, encryption requests, etc.

The threshold can be set empirically (e.g., manually set by an administrator) or the threshold can be automatically calculated based on specific parameters (e.g., server and client hardware configurations, a number of clients in the network, average resources required for the task of this type, etc.). For example, if the network contains 100 client computers and one server, and only a few clients request encryption of individual files during the day, the encryption can be performed by the server. However, if encryption requests come from dozens of computers and the encryption volume reaches tens of megabytes, then encryption agents need to be implemented on the clients. The agents can be installed on thick clients while the thin ones can still delegate encryption tasks to the server.

If the threshold is not exceeded in step 710, collection of statistics is continued in step 715. Statistics can be collected over a certain time period, for example, an hour. However, hourly statistics may not indicate that special modules are need on the clients because during a certain hour a number of requests exceeded the threshold. Therefore, an average for the requests received over 8-9 hours is calculated and used.

In step 720, the process checks if the client has sufficient resources for installation of the module that deals with the problems of the required type. For example, encryption tasks may require a fast processor (e.g., a 2 GHz Core i5). If the client does not have sufficient resources, the task is executed by the server in step 725. However, if the client has sufficient resources in step 720, the server load can be decreased and the required module is installed on the client in step 730. The modules can be installed on the server ahead of time in order to process the delegated clients' tasks.

Figure 8:
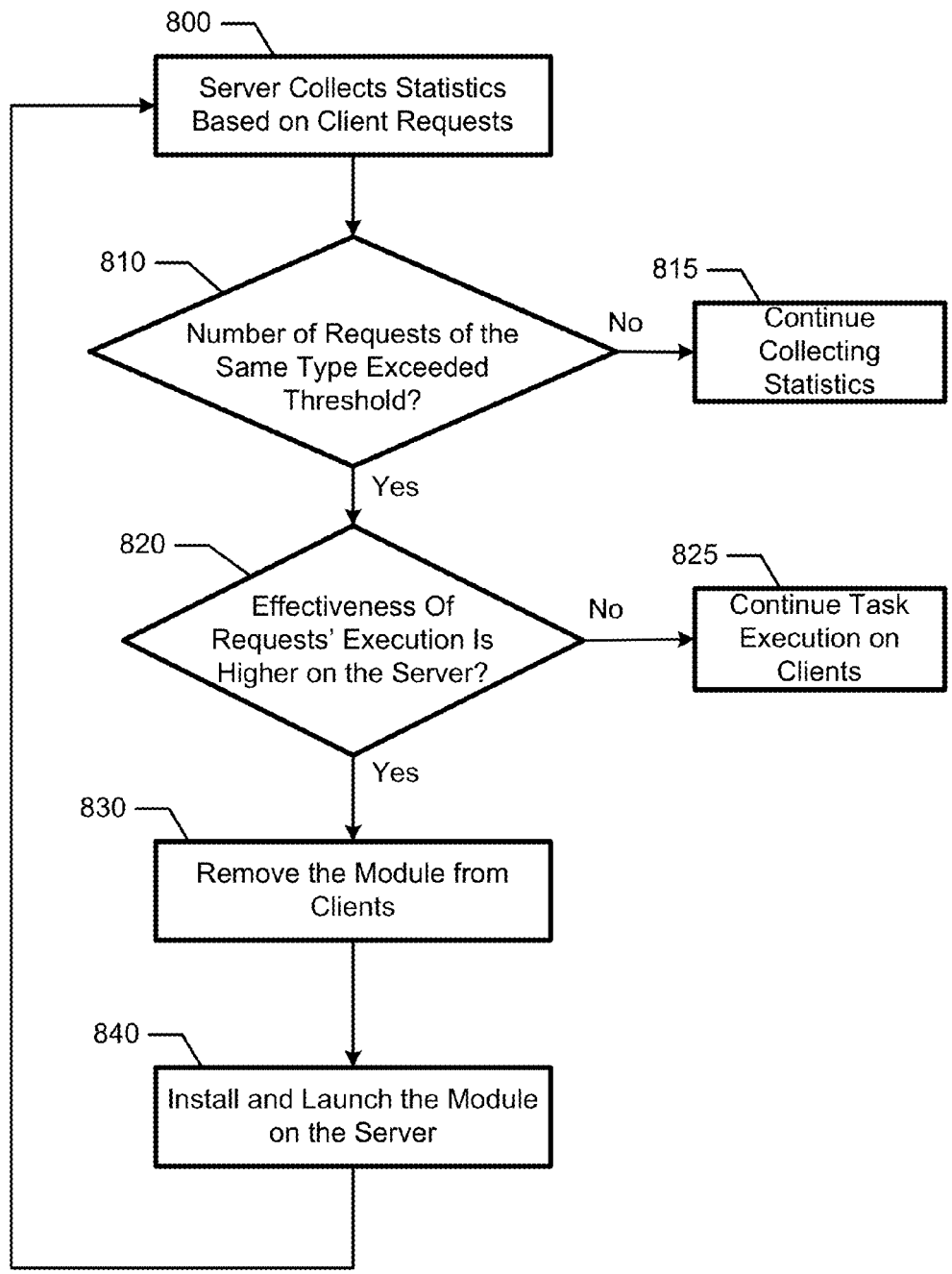
FIG. 8 illustrates a block diagram of an algorithm for re-configuration of the server modules, in accordance with the exemplary embodiment.

FIG. 8 illustrates a block diagram of an algorithm for re-configuration of the client modules. In step 800, the server collects statistics bases on clients' requests. The server analyses the clients' requests and the clients' module sets. In step 810, the process determines if a number of requests of the same type exceed a threshold. The requests of the same type can be, for example, the request for file checks or for spam analysis of the incoming mail.

If the threshold is not exceeded in step 810, collection of statistics is continued in step 815. In step 820, the process determines if the effectiveness of execution of the requested (delegated) tasks is higher on the server. For example, more effective spam analysis can be determined on the server where a special module is used for mail redirection.

The effectiveness can be estimated based on a number of parameters, such as, for example, client-server bandwidth, and average resource requirement for the tasks of the given type and client and server hardware/software configuration. If users send emulation logs (especially if the logs reflect emulation of the same application) to the server and the server performs emulation with the strict configurations and detects malware, the emulation check is moved to the server side completely. In the exemplary embodiment, the effectiveness is calculated as a ratio of an aggregated speed of execution of the tasks of a given type on the server and the execution speed on the clients over a period of time (e.g., days, weeks and months).

Task execution speed on the server can be calculated in advance based on the gateway data reflecting functionality of the security modules. For example, Kaspersky AV for Check Point Firewall or Kaspersky Security for Microsoft Exchange Server have certain execution speeds. If the ratio is larger than one, the effectiveness on the server is higher.

If the effectiveness is lower on the server, the task is executed on the client in step 825. However, if the effectiveness is higher on the server in step 820, the module is removed from the client in step 830. Then, in step 740, the module(s) is installed on the server. Note that the modules can be installed on the server ahead of time in order to process the delegated clients' tasks. Installation of the modules on the server takes load off the clients and decreases overall network load.

According to the exemplary embodiment, on-going checks of effectiveness of tasks executions on the server and on the clients allows for estimation of effectiveness of the security modules on both sides. Effectiveness value can be calculated for every hour over an 8 hour period (e.g., the working hours) and then averaged out. Then effectiveness can be checked once a week, a month, etc. This is needed because new computers and servers are constantly added to a corporate network. Further re-configuration of client module sets can increase the effectiveness of security tasks' executions for the entire local network.

Figure 9:
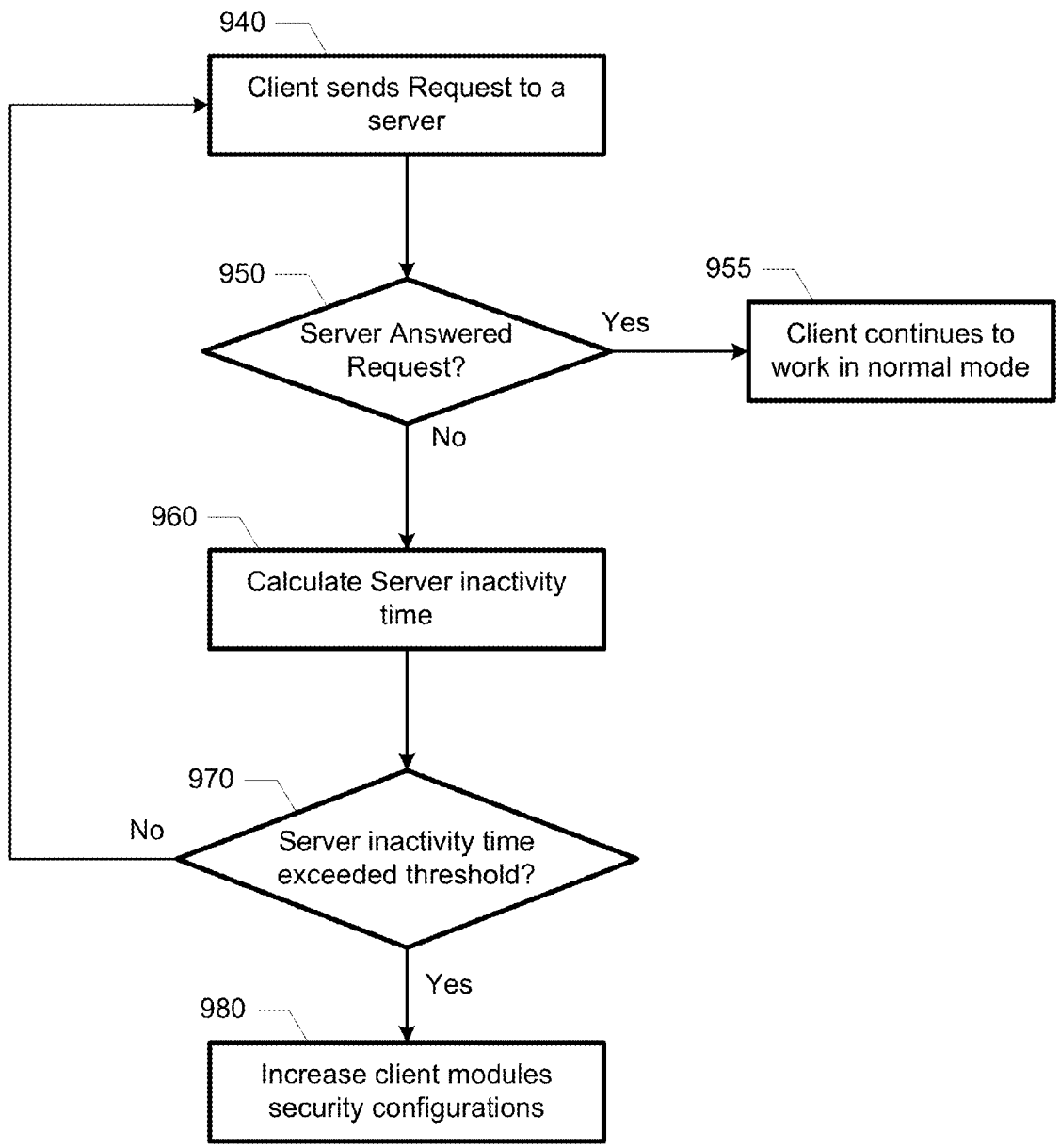
FIG. 9 illustrates an algorithm of reconfiguration of client module set in case of server shut off.

FIG. 9 illustrates an algorithm of reconfiguration of client module set in case of server shut off. This scenario is used in unforeseen situations when the server 210 cannot receive requests from clients 200. This can be causes by variety of factors, such as disconnection or cut off of connection channels (wired and wireless), overload of the connection channels that can be caused by DDoS-attacks resulting in unstable connection and data loss, unplanned server shut down, etc.

In step 940, the client 200 sends request to the server 210. If the server 210 receives the request in step 950, it sends the notification that the task is accepted for execution and the client 200 continues to work in a normal mode in step 955. Otherwise, the client 200 calculates server inactivity time (i.e., time from sending the request in step 940). Typically, server response does not take more than a few tens of milliseconds in a small LAN and take up to a few minutes for large distributed network containing several tens of thousands of computers. In step 960, the server inactivity (unresponsiveness) time is calculated.

Depending on a network size, a server inactivity threshold is selected. The server is guaranteed to answer to the client request under the threshold time. The threshold is automatically selected based on empirical data but can be modified by an administrator. In step 970, it is checked if the server inactivity time exceeds the threshold. If the threshold is not exceeded, the client sends a request again in step 940 (especially in cases when transmission protocols do not guarantee delivery, for example, UDP). If the threshold has been exceeded, the client increases security settings of its modules in step 980.

Increase of security configurations can be implemented as changes of policies of HIPS module, increasing emulation time and using virtual machine and etc. Alternatively, in step 980, an additional network connection with the AV servers (such as Kaspersky or Symantec) can be created for sending them security task-related information. In another embodiment, the delayed tasks are used. In this case, the clients do not send all the security tasks at once to the server 210. Instead, they send the tasks over certain time periods.

Figure 10:
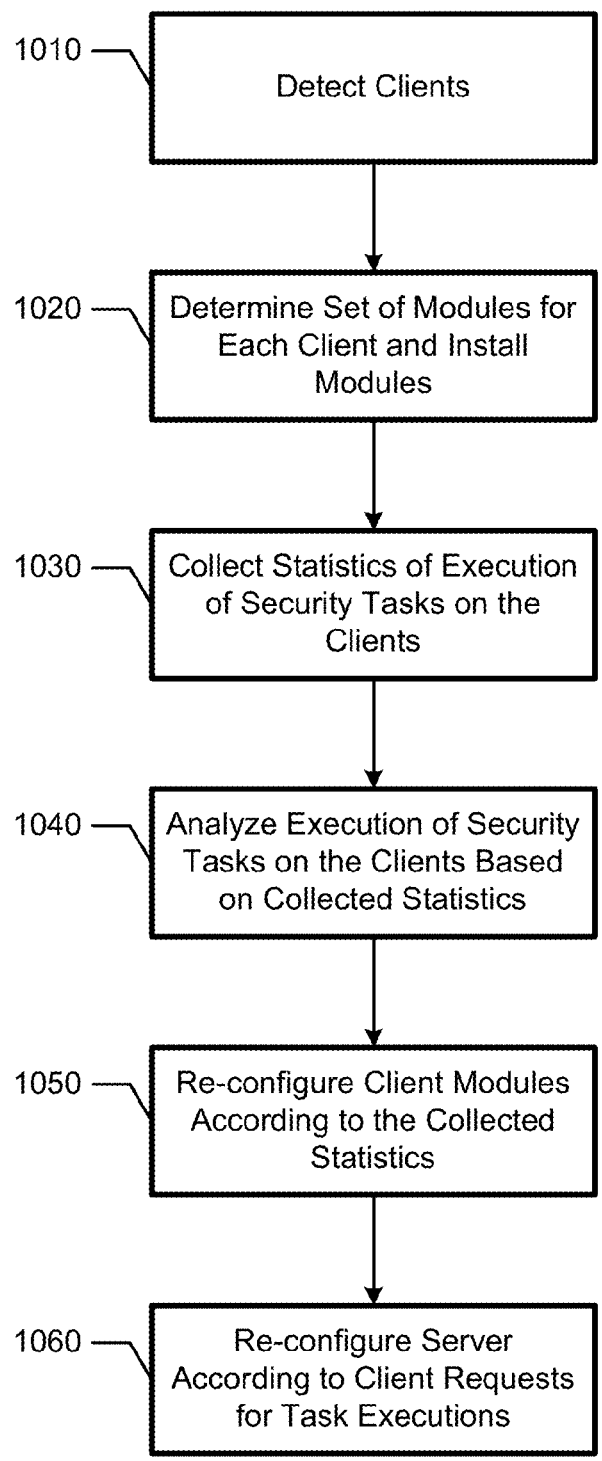
FIG. 10 illustrates a method for task optimization, in accordance with the exemplary embodiment.

FIG. 10 illustrates a method for task execution optimization, in accordance with the exemplary embodiment. In step 1010, network clients are detected. In step 1020, a set of modules required for each client (based on client configuration) are determined and the modules are installed on the clients. Then, in step 1030, statistics of execution of the security task on the clients are collected. The security tasks' execution on the clients is analyzed based on the collected statistics in step 1040. In step 1050, the client modules are re-configured according to the collected statistics. In step 1060, the server is re-configured according to the clients' requests for tasks execution.

Figure 11:
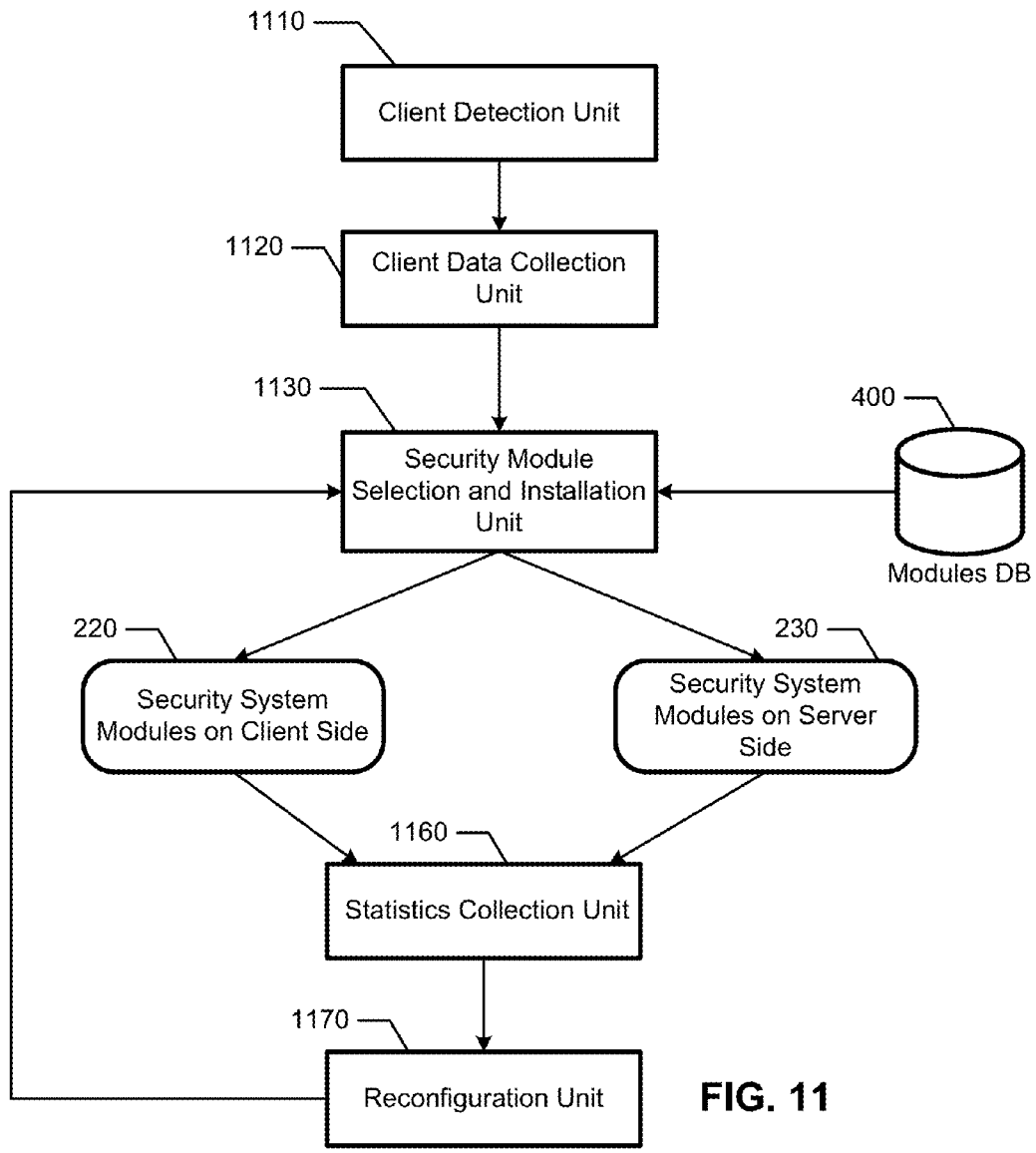
FIG. 11 illustrates a system for optimization of execution of the security tasks, in accordance with the exemplary embodiment.

FIG. 11 illustrates a system for optimization of execution of the security tasks in accordance with the exemplary embodiment. A client detection unit 1110 finds the clients on the network. An ARP protocol can be used for detection of the clients. A client data collection unit 1120 determines hardware/software configurations of each detected client. This data is provided to a security module selection and installation unit 1130. The unit 1130 uses the modules database 400 for selection of the required modules for each client.

Thus, the module selection and installation unit 1130 determines a set of the security modules 220 to be installed on the client and a set of the security modules 230 installed on the server. In case of the server, the security modules 230 can be installed on an as-needed basis or can be pre-installed. In order to save the server resources, the pre-installed modules might not be activated until a user requests the service provided by the pre-installed module. The client modules 220 and the server modules 230 provide security tasks execution statistics to a statistics collection unit 1160 that aggregates received data for a reconfiguration unit 1170.

The reconfiguration unit 1170 sends commands to the module selection and installation unit 1130 for selecting an optimal set of the security modules 220 and 230. This, advantageously, optimizes execution of the security tasks within the local network.

Figure 12:
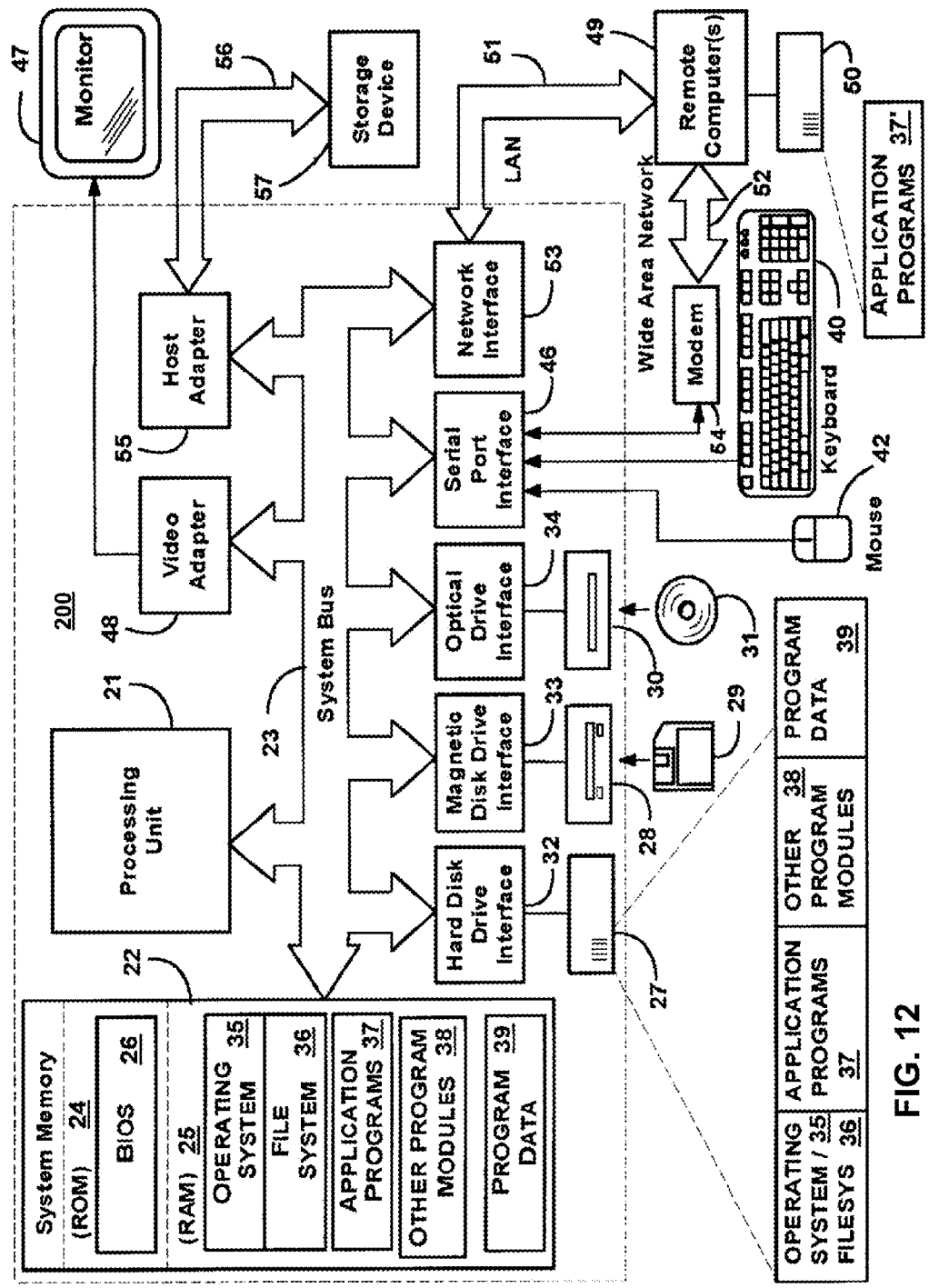
FIG. 12 illustrates a schematic of an exemplary computer system that can be used for implementation of the invention.

With reference to FIG. 12, an exemplary system for implementing the invention includes a general purpose computing device in the form of a computer 200 (or server 210) or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 200, such as during start-up, is stored in ROM 24.

The computer 200 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 200.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 200 includes a file system 36 associated with or included within the operating system 35, one or more application programs 37, other program modules 38 and program data 39. A user may enter commands and information into the computer 200 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 200 may operate in a networked environment using logical connections to one or more remote computers 49. The remote computer (or computers) 49 may be another computer, a server, a router, a network PC, a peer device or other common network node, and typically includes many or all of the elements described above relative to the computer 200, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 200 is connected to the local network 51 through a network interface or adapter 53. When used in a WAN networking environment, the computer 200 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 200, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for optimization of execution of security tasks by delegating task execution to the server and reconfiguration of the security modules.

It should also be appreciated that various modifications, adaptations and alternative embodiments thereof may be made within the scope and spirit of the present invention. The invention is further defined by the following claims.

What is claimed is:

1. A computer-implemented system for optimization of execution of security tasks, the system comprising:
    a client data collection unit for determining hardware and software configurations of clients detected as being connected to a network;
    a security module selection unit connected to the client data collection unit for selecting security modules for the clients for subsequent installation of the selected security modules on the clients and on a server;
    a statistics collection unit that collects security-related statistics from the clients and from the server; and
    a configuration unit for configuring the installed security modules based on the collected security-related statistics,
    wherein a security task is executed on a client, if the client has a corresponding installed security module, and the security task is executed on the server, if the client does not have the corresponding security module.

2. The system of claim 1, wherein the system uses ARP-spoofing for detecting which clients are connected to the network.

3. The system of claim 1, further comprising a database storing data of the security modules, wherein the data of the security modules is any of:
    module name;
    module version;
    incompatibilities with operating systems;
    incompatibilities with applications;
    hardware requirements;
    types and volumes of designated data;
    types of interaction with other modules; and
    capacity in different work modes.

4. The system of claim 1, wherein the security module is any of:
    a file antivirus;
    a mail antivirus;
    a web antivirus;
    an IM antivirus;
    a HIPS module;
    a network screen;
    an anti-spam module;
    an anti-phishing module;
    a virtual machine;
    an emulator;
    a virtual keyboard;
    a parental control module;
    an update module;
    a personal data manager;
    an encryption module; and
    a backup module.

5. The system of claim 1, wherein the security tasks performed by the security modules are any of:
    antivirus check of a file;
    antivirus check of a web page;
    emulation of executable files;
    execution of a file in a virtual environment;
    spam scan of mail;
    data encryption;
    management of personal data;
    implementation of a virtual keyboard;
    generation of a backup copy;
    update of the modules database;
    parental control;
    limiting access to system resources;
    control of network connections; and
    blocking of unwanted content.

6. The system of claim 5, wherein each security task is executed by a dedicated security module.

7. A computer-implemented method for optimization of security tasks, the method comprising:
    (a) collecting configuration data of clients connected to a network;
    (b) installing security modules on the clients based on the client's configuration;
    (c) monitoring activity of the security modules on the clients;
    (d) collecting security-related statistics from the clients and from the server;
    (e) analyzing execution of the security tasks based on the collected security-related statistics; and
    (f) configuring the installed security modules based on the collected statistics,
    wherein a security task is executed on a client, if the client has a corresponding security module, and the security task is executed on the server, if the client does not have the corresponding security module.

8. The method of claim 7, wherein the detecting of whether clients are connected to the network is performed by the client by ARP-spoofing.

9. The method of claim 7, wherein the configuration includes hardware and software configurations.

10. The method of claim 7, wherein the security task is executed on the server, if the client does not have sufficient resources.

11. The method of claim 10, wherein the security task executed on the server has an assigned execution priority.

12. The method of claim 7, wherein each security task is executed by a dedicated security module.

13. The method of claim 7, wherein the configuring of the clients comprises removing the security modules.

14. The method of claim 7, wherein the configuring of the clients comprises installation of additional security modules.

15. The method of claim 7, further comprising configuring of the server that includes installing the security modules based on client requests.

16. The method of claim 7, wherein the security modules are pre-installed on the server and activated upon a user request.

17. The method of claim 7, wherein the security task is executed on the server if the client does not have sufficient resources.

18. The method of claim 7, wherein the security task is executed on the server if an effectiveness of the task execution is higher on the server, even if a corresponding security module is installed on the client.

19. The method of claim 18, wherein the effectiveness of the task execution is determined as a quotient of an aggregated speed of execution of the tasks of a given type on the server and the execution speed of the tasks on the clients over a certain time period.

20. A system for optimization of execution of security tasks, the system comprising:
- a processor;
- a memory coupled to the processor;
- a computer program logic stored in the memory and executed on the processor, the computer program logic for implementing the steps of claim 7.

* * * * *